Jan. 4, 1955  A. RONNING  2,698,759
STEERING CONTROLLED TANDEM WHEEL SUSPENSION
Filed Nov. 29, 1950  2 Sheets-Sheet 2
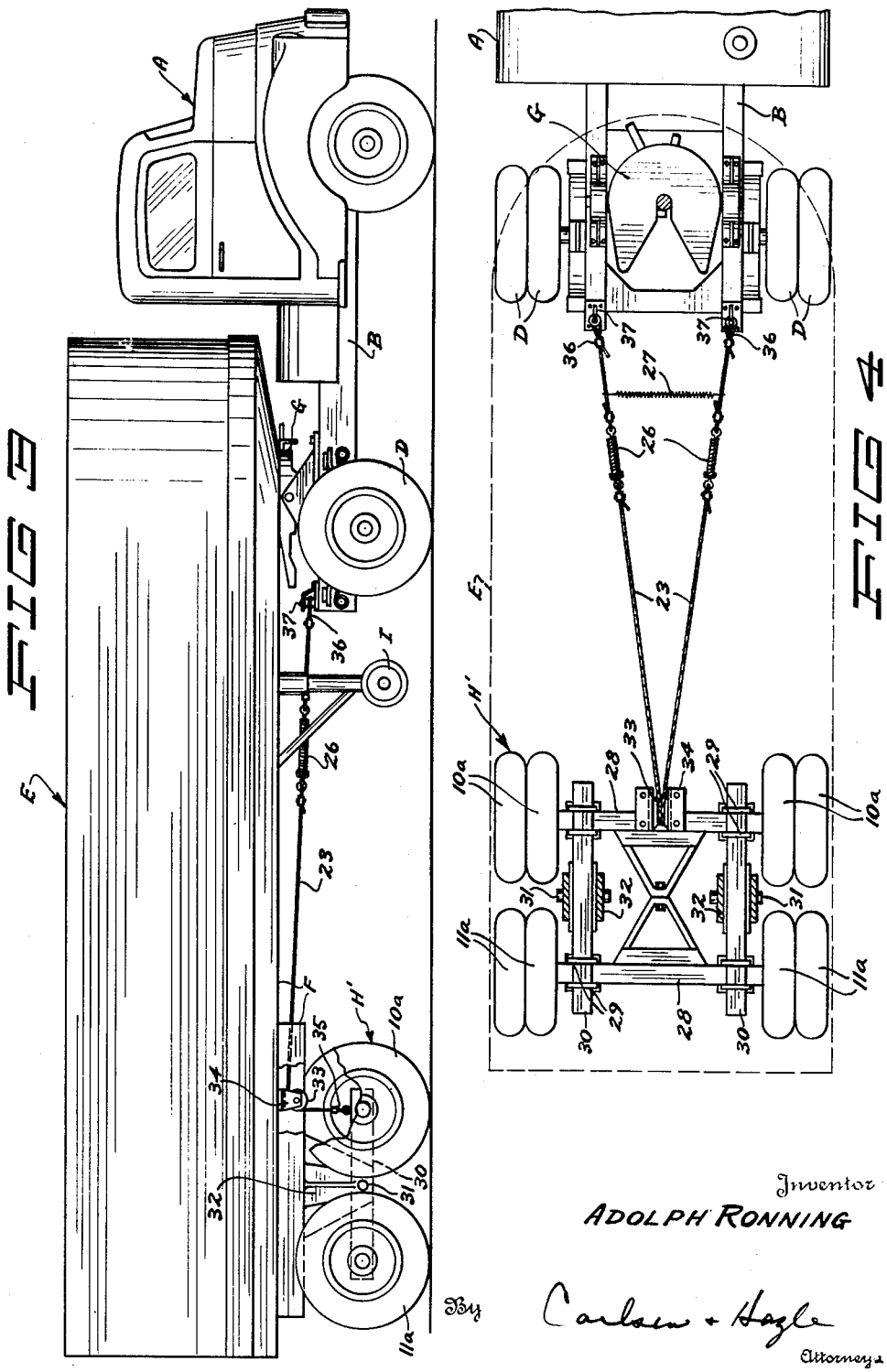
Inventor
ADOLPH RONNING
By Carlsen + Hagle
Attorneys

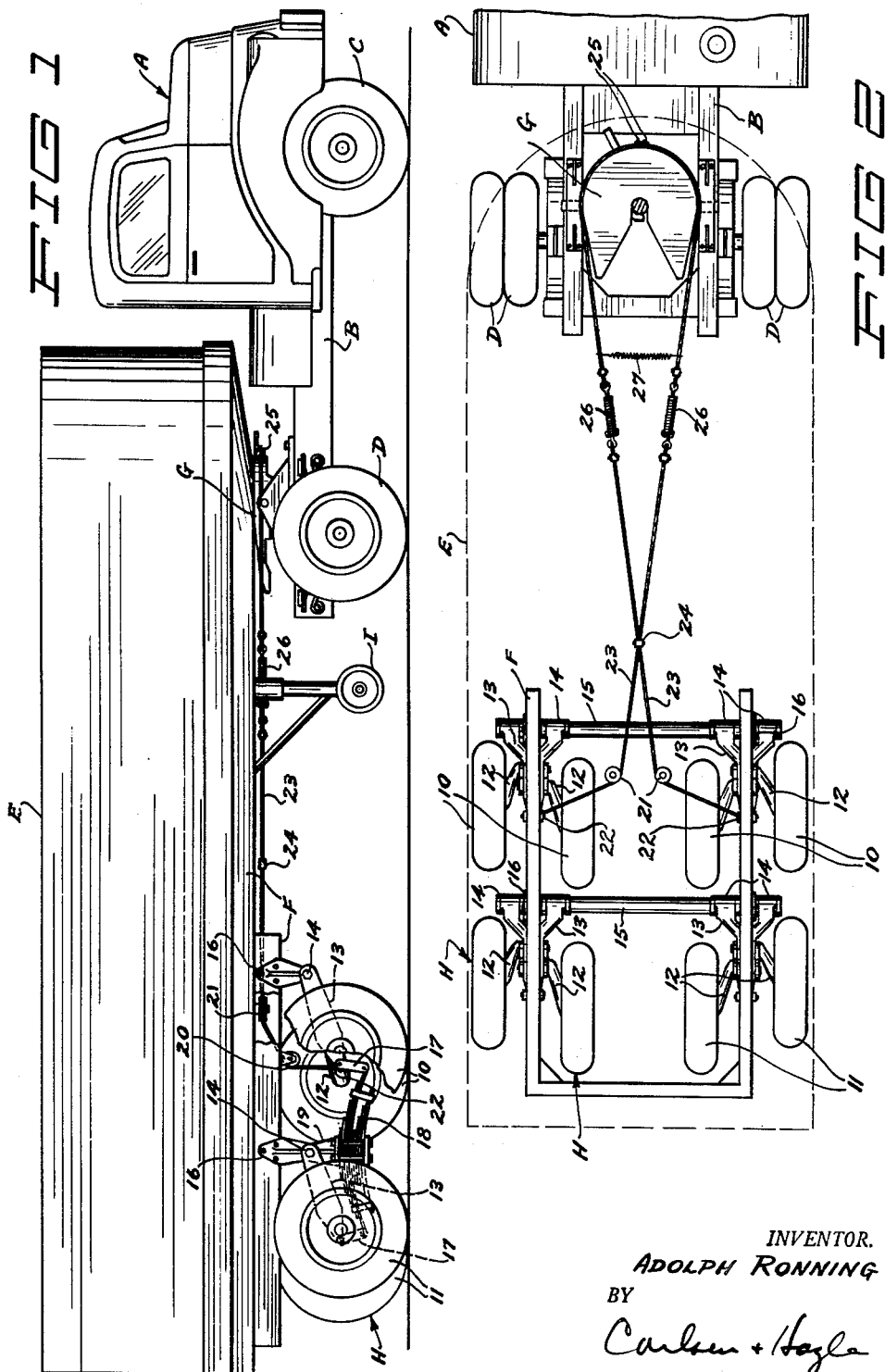

United States Patent Office 2,698,759
Patented Jan. 4, 1955

2,698,759

STEERING CONTROLLED TANDEM WHEEL SUSPENSION

Adolph Ronning, Minneapolis, Minn.

Application November 29, 1950, Serial No. 198,080

8 Claims. (Cl. 280—423)

This invention relates generally to improvements in tandem wheel suspensions of the type used upon heavy duty semi-trailers and similar equipment.

In the ordinary semi-trailer the forward end of the trailer body, or frame, is supported by a fifth wheel mechanism upon a steerable tractor unit, while the rear end is carried by tandem-arranged wheel sets at each side so connected that as the forward wheels of the tandem suspension move upwardly, the rear wheels move downwardly, and vice versa. The purpose of this tandem suspension is, of course, to permit the use of a great number of wheels while equally distributing the load thereto. In most present day suspensions the tandem wheel sets are carried upon forwardly and rearwardly extending walking beams, fulcrumed intermediate their ends to the trailer frame, and in addition transversely extending axles or bolsters are provided connecting the respective wheel sets at the opposite sides of the trailer. In my prior co-pending application for Vehicle, Serial No. 601,030 filed June 22, 1945, now Patent No. 2,612,387, I have disclosed a tandem wheel suspension having numerous advantages over the standard construction, and in the present application I disclose the instant invention as applied to both types of wheel assemblies. Insofar as pertinent to the present invention I have described the improved wheel suspension in this application, and it is sufficient to note that my tandem wheel sets are individually suspended and connected for the necessary up and down equalizing movements, but the corresponding wheel sets at opposite sides are not cross-connected by axles or bolsters as is the case in what may be called the standard job.

However constructed, such tandem wheel assemblies have one disadvantage in practical operation in that their front and rear wheel sets are, of course, not steerably mounted, and thus they act as a fixed wheel base vehicle, so that in turning a corner the wheels must invariable skid sidewise to some extent. Such skidding of these wheels, of course, causes damage to the tires and has other well known undesirable effects, and this action is particularly noted when backing semi-trailers up to a loading dock in which case very sharp turns are frequently made and the tires are very forcefully skidded across the ground or road surface. It is the primary object of my present invention to provide means for picking up corresponding wheel sets at opposite sides of the trailer when making a turn, lifting one wheel set at each side substantially out of road surface contact, and thus to completely overcome or at least greatly reduce this undesirable skidding of the tires, as will be readily apparent.

Another object of my invention is to provide means or mechanism for this purpose which is operative automatically in response to the steering movements of the forward steerable unit or tractor, so that the action requires no attention upon the part of the driver, and so that the effective distance through which the wheels are lifted is proportioned to the sharpness of the turn, but enough to reduce skidding on even gradual turns.

A further object of my invention is to provide mechanism of this nature which may be readily applied to the semi-trailer and to any known type of tandem wheel suspension, and which mechanism is extremely simple and practical in nature.

Still another object is to provide a steering controlled tandem wheel pick-up mechanism which may be attached to the frame or chassis of the tractor unit or to the fifth wheel thereon and which includes suitable means for cushioning the lifting forces exerted upon the wheels, as well as means for taking up slack in the operating cables.

These and other more detailed and specific objects will be disclosed in the course of the following specification, reference being had to the accompanying drawings, in which—

Fig. 1 is a side elevation of a semi-trailer including a trailer and towing tractor with a tandem wheel suspension according to my previously identified application, and showing the application thereto of means for picking up one wheel set at each side of the trailer in response to steering movements and travel of the tractor unit.

Fig. 2 is a fragmentary plan view of rear frame portions of the tractor and the trailer showing the pick-up mechanism and indicating in dotted outline the body of the trailer per se.

Fig. 3 is a side elevation similar to Fig. 1, but showing what may be referred to as a standard type of rear wheel suspension and illustrating the application thereto of a slightly modified version of the pick-up mechanism.

Fig. 4 is a plan view identical to Fig. 2, but showing the standard wheel suspension and the pick-up mechanism of Fig. 3.

Referring now more particularly and by reference characters to the drawing, I have shown in Figs. 1 and 2 thereof a conventional tractor unit A including a chassis or frame B with steerable front wheels C and rear traction wheels D. This tractor unit is adapted to use with the well known trailer body E which includes a base frame F having a suitable connection at its forward end to the conventional fifth wheel mechanism G upon the tractor frame B. The trailer is carried by a tandem rear wheel assembly, designated generally at H, when in normal operation and is, of course, provided with the usual dolly wheels I to support it when it is disconnected from the tractor.

The rear wheel suspension unit or assembly H is identical to that disclosed in my prior co-pending application, Serial No. 601,030, and comprises at each side of the trailer, a front wheel pair or set 10 and corresponding rear wheel set 11. These wheels 10 and 11 are pneumatically tired, are closely spaced and are carried at the rear ends of cranked axles 12, the forward ends of which are journaled in vertically swinging differential members 13 pivoted at their forward ends 14 to cross tubes 15 suspended by brackets 16 on the frame F. These differential members 13 carry differential mechanism (not shown) joining the axles 12 so that as either wheel of the wheel pair or set moves upwardly in traveling over an obstruction, the opposite wheel is moved downwardly an equal amount. In addition to this compensating action, the differential members 13 are connected at 17 to the opposite ends of spring walking beams 18 and the latter are fulcrumed intermediate their ends by bearings 19 upon the rear cross tube 15. Thus as either wheel set (at either side) moves upwardly, the other wheel set on the same side is moved downwardly by an equal amount with the typical walking beam compensating action of these tandem wheel assemblies.

It is believed that the foregoing description will suffice for the understanding of this wheel suspension in connection with this particular application and attention is invited to my co-pending application for a more complete disclosure of its construction and operation.

It will, of course, be obvious that with all of the tandem wheels in road surface contact, they must skid to some extent when the semi-trailer takes a curve, and particularly so when it is sharply turned in maneuvering in crowded areas or adjacent a loading dock. This skidding of necessity results in undesirable wear upon the tires and is a well known undesirable characteristic of all tandem wheel suspensions to my knowledge. In accordance with my present invention, I provide over each forward differential member 13 a pulley 20 located upon a generally horizontal axis. Inwardly a pair of pulleys 21 is arranged upon vertical axis and all of these pulleys are suitably secured to the trailer frame F, as indicated in the drawing. Attached at 22 to the rear extremity of each forward differential member 13 is the rear end of a cable 23 which extends upwardly from this connection over the adjacent pulley 20 and thence inwardly and forwardly around the adjacent pulley 21 toward the tractor unit A. As clearly shown in the drawing there are thus two of such cables 23, one for each side of the tandem wheel suspension, and forwardly of the pulleys 21 these cables are crossed and firmly connected by a conventional U-clamp 24 from which point the cables diverge in a forward direction so that they may be brought around the fifth wheel G from opposite directions, as seen in Fig. 2. The forward extremities of the cables 23 are then detachably secured to the fifth wheel G as designated at 25 and the arrangement is thus obviously such that as the tractor unit is steered in either direction a pull will be exerted upon one of the cables 23 while the other is slacked off between the connection 24 and fifth wheel G. This pull upon either cable causes the rear portions of both to travel around the pulleys 20—21 and exert an upward force upon the forward differential members 13 so as to lift the forward wheel sets 10 at each side substantially out of road surface contact. Thus the skidding of the tires on these wheels will be eliminated or materially reduced, automatically and without any attention upon the part of the operator.

In order to cushion the forces exerted upon the cables as the tractor unit is steered in various directions, I provide in each cable, forward of the connection 24, a spring element indicated at 26 which is of the type permitting play by the connected portions of the cables, but such that the breakage of the spring itself will not result in a separation of the cables. In addition and in order to take up the slack in the cable which is not pulling, I cross-connect the cables forwardly of the spring elements 26 with a retractile coil spring 27 appearing in Fig. 2 and the operation of which will be obvious.

In Figs. 3 and 4 I disclose a modification of my present invention, adapted to use of the standard type of rear tandem wheel assembly H', and with a modification of the forward operating connections to the cables. The tractor A and trailer E are, of course, identical to those previously described and the same reference characters denote the corresponding parts. In this case, however, the rear wheel suspension H' comprises, for each side of the trailer, a forward dual wheel set 10a and rear dual wheel set 11a, and these wheels are journaled at the opposite ends of transversely extending axles or bolsters 28. Adjacent their extremities the bolsters 28 are attached at 29 to forwardly and rearwardly extending walking beams 30 and these are fulcrumed intermediate their ends at 31 in brackets 32 depending from the trailer frame F.

In adapting the principles of my invention to this wheel suspension, the cables 23 adjacent their rear ends run downwardly over a wide pulley 33, carried in a bearing bracket 34 beneath the frame, and both cables are connected at their rear ends at 35 to the center of the forward (or rear if desired) bolster 28. Thus a pull upon either cable 23 will pick up this forward bolster 28 and its connected dual wheel front wheels 10a, giving the same effect as the previously described construction, it being noted that the difference in cable arrangement at this point is made necessary by the fact that in this standard tandem suspension the front wheels are cross-connected by the bolster, whereas in the suspension of Figs. 1 and 2 the corresponding wheels 10 have no such cross-connection.

The cables 23 extend forwardly from the pulley 33 and may, instead of being attached to the fifth wheel G, be detachably connected at 36 to suitable fittings 37 at the rear corners of the tractor frame B, and such connection will, of course, bring about the same pull upon the cables responsive to steering movements of the tractor and may, in some cases, be preferable to the connection of the cables to the fifth wheel mechanism. I have here also shown the cushioning spring elements 26 and the slack take-up spring 27 for the purposes previously described.

It will be noted that since the wheels are lifted by the steering movement of the tractor unit the resulting upward pull on the wheels will be proportioned to the sharpness at which the assembly turns but in any case the pull will be sufficient to reduce skidding of the tires on even a very gradual turn.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination in a vehicle having a forwardly located steerable unit and a tandem rear wheel assembly including a wheel unit at each side of the vehicle supported for up and down movements with reference to the road surface, of mechanism for lifting said wheel units substantially out of road surface contact when the steerable unit is steered to either side, comprising a flexible element connected to each wheel unit and extending first generally upwardly and then forwardly therefrom to the steerable unit, pulleys supporting the flexible elements from the vehicle where they turn in the forward direction, means connecting the flexible elements forwardly of the wheel units and pulleys whereby the flexible elements operate in unison and means connecting the forward ends of the flexible elements to the steerable unit in such manner that steering movements thereof will pull on said elements and lift the said wheel units.

2. The combination in a vehicle having a forwardly located steerable unit and a tandem rear wheel assembly including a wheel unit at each side of the vehicle supported for up and down movements with reference to the road surface, of mechanism for lifting said wheel units substantially out of road surface contact when the steerable unit is steered to either side, comprising a flexible element connected to each wheel unit and extending first generally upwardly and then forwardly therefrom to the steerable unit, pulleys supporting the flexible elements from the vehicle where they turn in the forward direction, means connecting said flexible elements to each other forwardly of the wheel units and pulleys whereby the flexible elements operate in unison means connecting the forward ends of the flexible elements to the steerable unit in such manner that steering movements thereof will pull on said elements and lift the said wheel units, and springs connected in and forming part of said flexible elements to absorb shocks as the pull is transmitted from the steerable unit to the wheel units.

3. The combination in a vehicle having a forwardly located steerable unit and a tandem rear wheel assembly including a wheel unit at each side of the vehicle supported for up and down movements with reference to the road surface, of mechanism for lifting said wheel units substantially out of road surface contact when the steerable unit is steered to either side, comprising a flexible element connected to each wheel unit and extending first generally upwardly and then forwardly therefrom to the steerable unit, pulleys supporting the flexible elements from the vehicle where they turn in the forward direction, means connecting the said flexible elements together forwardly of the wheel units and pulleys whereby the flexible elements operate in unison, means connecting the forward ends of the flexible elements to the steerable unit in such manner that steering movements thereof will pull on said elements and lift the said wheel units, and a retractile spring element cross connected between the flexible elements for taking up slack therein.

4. The combination in a vehicle including a forwardly located steerable unit and a tandem rear wheel assembly having a rear wheel unit at each side supported for independent up and down movements with respect to the road surface, of a cable and pulley system for lifting said wheel units substantially out of road surface contact when a turn is being made, comprising a cable connected to each of the wheel units and extending first generally upward and then forward and so connected to the steerable unit that steering movements thereof in either direction will pull on one cable or the other, pulleys supported from the vehicle and supporting the cables above said wheel units, and the cables being secured together forwardly of the pulleys and rearwardly of the steerable unit whereby a pull on the forward end of either cable will result in a pull being exerted on the rear ends of both cables to thereby lift said wheel units in unison.

5. The combination in a vehicle including a forwardly located steerable unit and a tandem rear wheel assembly having a rear wheel unit at each side supported for independent up and down movements with respect to the road surface, of a cable and pulley system for lifting said wheel units substantially out of road surface contact when a turn is being made, comprising a cable connected to each of the wheel units and extending first generally upward and then forward toward the steerable unit, said unit including a fifth wheel mechanism which turns about a vertical axis as the unit is steered, means connecting the forward ends of the cables to the said fifth wheel unit whereby steering movement in either direction will result in a forward pull on one or the other of the cables, pulleys supported from the vehicle and supporting the cables above the wheel units whereby a forward pull on the cables will result in an upward pull upon said wheel units, and means securing both cables together forward of the pulleys whereby the rear end portions of the cables will pull in unison upon the wheel units.

6. The combination in a tractor-trailer vehicle including a forwardly located steerable tractor unit and a rearwardly located trailer unit which is supported at its rear end upon a tandem wheel assembly having one wheel unit at each side supported for up and down movements in unison with respect to the road surface, of a wheel lift mechanism for lifting said wheel units substantially out of road surface contact when the vehicle is steered around a turn in either direction, comprising a pair of cables connected to said wheel units and extending therefrom first generally upward and then turning forward toward the tractor unit, pulleys supported from the trailer and supporting the cables when they turn forward, means connecting the cables forwardly of the wheel units and pulleys whereby the cables operate in unison, and means connecting the forward ends of the cables to the tractor at transversely spaced points and at opposite sides of the longitudinal center line thereof.

7. The combination in a tractor-trailer vehicle including a forwardly located steerable tractor unit and a rearwardly located trailer unit which is supported at its rear end upon a tandem wheel assembly having one wheel unit at each side supported for up and down movements in unison with respect to the road surface, a bolster element cross connecting the wheel units, of a wheel lift mechanism for lifting said wheel units substantially out of road surface contact when the vehicle is steered around a turn in either direction, comprising a pair of cables connected to said bolster element and extending therefrom first upwardly and then turning forward toward the tractor, pulley means supported on the trailer and supporting the cables when they turn forwardly, and means connecting the forward ends of the cables to the tractor at transversely spaced points and at opposite sides of the longitudinal center line of the vehicle.

8. The combination in a vehicle having a forwardly located steerable unit and a tandem rear wheel assembly including a wheel unit at each side of the vehicle supported for up and down movements with reference to the road surface, of mechanism for lifting said wheel units substantially out of road surface contact when the steerable unit is steered to either side, comprising a tensile element connected to each wheel unit and extending first generally upwardly and then forwardly therefrom to the steerable unit, means supporting the said tensile elements from the vehicle where they turn in the forward direction, means connecting said elements together forwardly of the wheel units and said supporting means for the elements whereby the tensile elements operate in unison, and means connecting the forward ends of the tensile elements to the steerable unit in such manner that steering movements thereof will pull on said elements and lift the said wheel units.

References Cited in the file of this patent
UNITED STATES PATENTS

| 1,857,249 | Marcum | May 10, 1932 |
| 1,981,593 | Fageol | Nov. 20, 1934 |
| 2,359,978 | Edwards | Oct. 10, 1944 |